United States Patent
Glickman et al.

(10) Patent No.: US 11,772,481 B2
(45) Date of Patent: *Oct. 3, 2023

(54) STRUCTURAL COOLING PACK

(71) Applicant: Ford Global Technologies, LLC, Dearborn, MI (US)

(72) Inventors: David Brian Glickman, Southfield, MI (US); Sean Terence Coghlan, Canton, MI (US); James Alan Acre, Monroe, MI (US); Darshan Arun Nayak, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 152 days.

This patent is subject to a terminal disclaimer.

(21) Appl. No.: 17/321,635

(22) Filed: May 17, 2021

(65) Prior Publication Data

US 2021/0268894 A1 Sep. 2, 2021

Related U.S. Application Data

(63) Continuation of application No. 16/524,234, filed on Jul. 29, 2019, now Pat. No. 11,014,440.

(51) Int. Cl.
*B60K 11/00* (2006.01)
*B60K 11/04* (2006.01)
(Continued)

(52) U.S. Cl.
CPC ............ *B60K 11/04* (2013.01); *B29C 64/106* (2017.08); *B33Y 80/00* (2014.12); *B62D 65/10* (2013.01);
(Continued)

(58) Field of Classification Search
CPC ...... B60K 11/06; B60K 11/04; B60D 25/084; B60D 65/10; B33Y 80/00; B33Y 70/00
(Continued)

(56) References Cited

U.S. PATENT DOCUMENTS 5,219,016 A 6/1993 Bolton et al.
6,155,335 A * 12/2000 Acre ...................... F28F 9/002
123/41.58

(Continued)

FOREIGN PATENT DOCUMENTS

KR 20090065855 A 6/2009
KR 20120015089 A 2/2012

OTHER PUBLICATIONS

Pryweller, Joseph. "Textron Creates First Shroud, Reservoir Assembly," Automotive News, Nov. 10, 1997, downloaded on May 18, 2019 from https://www.autonews.com/article/19971110/ANA/711100799/textron-creates-first-shroud-reservoir-assembly.

*Primary Examiner* — Hau V Phan
(74) *Attorney, Agent, or Firm* — Vichit Chea; Carlson, Gaskey & Olds, P.C.

(57) ABSTRACT

A structural cooling assembly for a vehicle includes a housing defining a first pocket between a front face and a back face. The housing comprising a single integrated part including a fluid reservoir portion, a vane portion, a fan shroud portion, a bolster portion, and at least one mounting portion mountable to a frame of a vehicle. A condenser is mounted within the first pocket, a charge air cooler is mounted in a second lower packet, a fan assembly is mounted within the fan shroud portion and a radiator is mounted to the back face.

20 Claims, 8 Drawing Sheets

(51) Int. Cl.

| | | |
|---|---|---|
| *B62D 65/10* | (2006.01) | |
| *B33Y 80/00* | (2015.01) | |
| *B29C 64/106* | (2017.01) | |
| *B60S 1/50* | (2006.01) | |
| *B60S 1/48* | (2006.01) | |
| *B29L 31/30* | (2006.01) | |
| *B60Q 5/00* | (2006.01) | |
| *B33Y 10/00* | (2015.01) | |
| *B33Y 70/00* | (2020.01) | |
| *B29K 77/00* | (2006.01) | |
| *B29K 307/04* | (2006.01) | |
| *B62D 25/08* | (2006.01) | |

(52) U.S. Cl.
CPC ...... *B29K 2077/00* (2013.01); *B29K 2307/04* (2013.01); *B29L 2031/30* (2013.01); *B33Y 10/00* (2014.12); *B33Y 70/00* (2014.12); *B60Q 5/00* (2013.01); *B60S 1/487* (2013.01); *B60S 1/50* (2013.01); *B62D 25/084* (2013.01)

(58) Field of Classification Search
USPC .......................................................... 180/68.1
See application file for complete search history.

(56) References Cited

U.S. PATENT DOCUMENTS

| | | |
|---|---|---|
| 6,516,906 B2 | 2/2003 | Sasano et al. |
| 6,827,129 B2 | 12/2004 | Ozawa et al. |
| 6,883,589 B2 | 4/2005 | Ozawa et al. |
| 6,908,283 B2 | 6/2005 | Soofer et al. |
| 7,150,335 B2 | 12/2006 | Sasano et al. |
| 7,886,860 B2 | 2/2011 | Spieth et al. |
| 8,151,921 B2 * | 4/2012 | Okabe .................. B62D 25/084 180/68.4 |
| 8,579,060 B2 | 11/2013 | George et al. |
| 8,701,430 B2 | 4/2014 | Kitano et al. |
| 8,845,128 B2 | 9/2014 | Pickholz |
| 8,960,619 B2 | 2/2015 | Lecroq et al. |
| 9,186,980 B2 * | 11/2015 | Shibutani ............... B60K 11/04 |
| 9,200,848 B2 | 12/2015 | Lu |
| 9,261,285 B2 * | 2/2016 | Setsu ...................... F24F 13/30 |
| 9,326,447 B2 * | 5/2016 | Hovenga ............ A01D 41/1252 |
| 9,694,668 B1 | 7/2017 | Yun et al. |
| 9,902,254 B1 * | 2/2018 | Long ...................... B60K 11/04 |
| 11,014,440 B2 * | 5/2021 | Glickman ............. B60K 11/04 |
| 2007/0144713 A1 | 6/2007 | Sugimoto et al. |
| 2008/0251040 A1 | 10/2008 | Gubbles |
| 2012/0024494 A1 * | 2/2012 | Grasso ................... F28F 9/002 165/51 |
| 2013/0074410 A1 | 3/2013 | Berkeland |
| 2018/0022209 A1 * | 1/2018 | Shiheiber ............... B60K 11/06 165/288 |
| 2019/0100096 A1 | 4/2019 | Herlem |

* cited by examiner

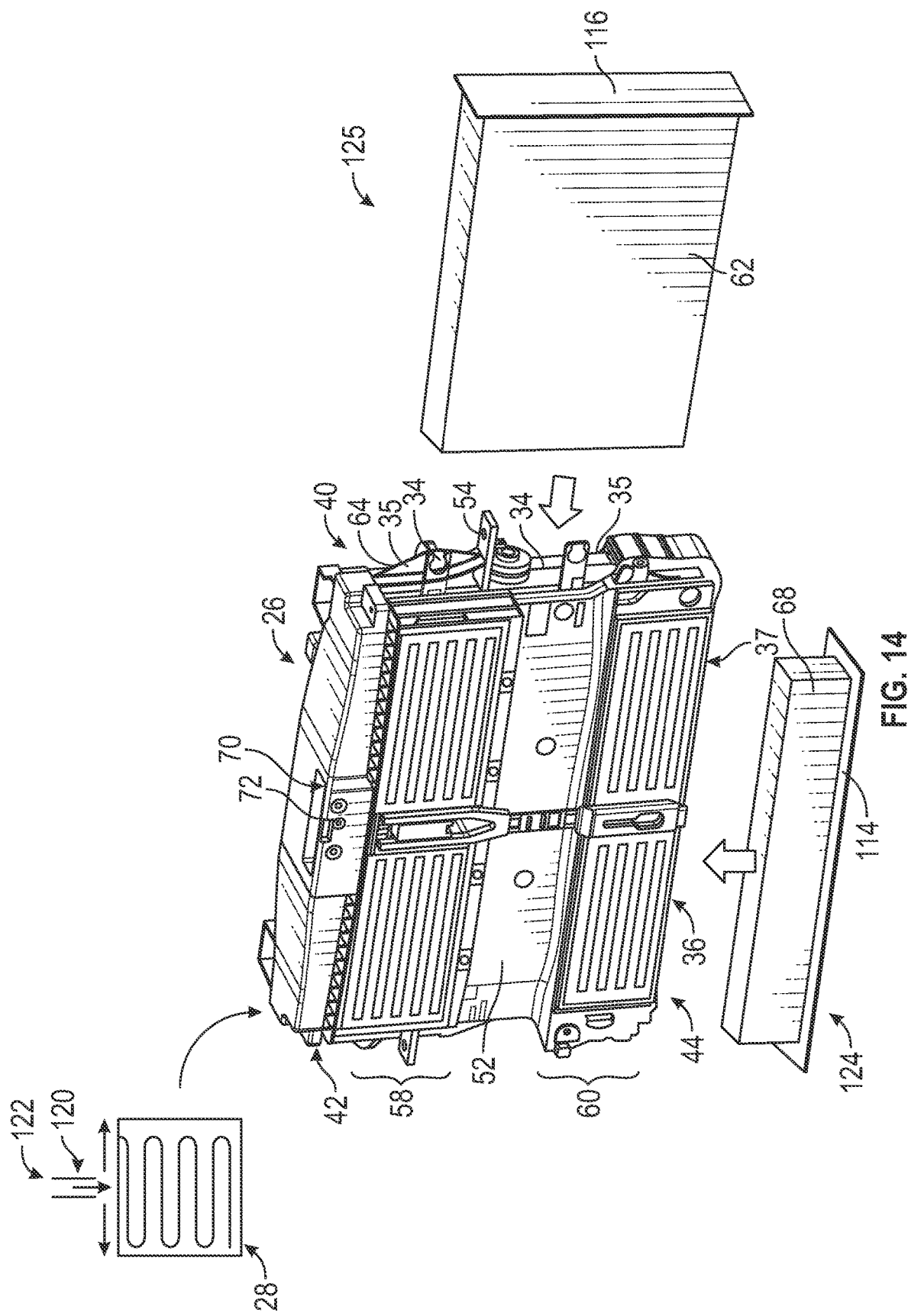

STRUCTURAL COOLING PACK

CROSS REFERENCE TO RELATED APPLICATION

This application is a continuation of U.S. application Ser. No. 16/524,234 filed on Jul. 29, 2019.

TECHNICAL FIELD

This disclosure relates to a front end structure for a motor vehicle including a fan disposed between a radiator and a condenser within an integrated module.

BACKGROUND

The front end structure of a motor vehicles supports components such as a radiator, condenser, air induction components and latch assemblies. Space within the front end structure is limited and is challenge to package all required components while also providing desired performance and assembly efficiencies.

SUMMARY

A structural cooling assembly for a vehicle according to an exemplary aspect of the present disclosure includes, among other things, a housing defining a first pocket between a front face and a back face, the housing comprising a single integrated part including a fluid reservoir portion, a vane portion, a fan shroud portion, a bolster portion, and at least one mounting portion mountable to a frame of a vehicle, a condenser mounted within the first pocket, a fan assembly mounted within the fan shroud portion; and a radiator mounted to the back face.

In a further non-limiting embodiment of the foregoing structural cooling assembly, the housing includes a top portion and the fluid reservoir is part of the top portion.

In a further non-limiting embodiment of any of the foregoing structural cooling assemblies, the top portion includes an air intake passage defining a part of an airflow path to an air intake system of the vehicle.

In a further non-limiting embodiment of any of the foregoing structural cooling assemblies, the top portion extends from the forward face aft past the back face and over a top of the radiator.

In a further non-limiting embodiment of any of the foregoing structural cooling assemblies, a hatch latch assembly is attached within a latch pocket formed as part of the top portion.

In a further non-limiting embodiment of any of the foregoing structural cooling assemblies, the housing includes a washer fluid reservoir portion separate from the fluid reservoir portion, the washer fluid portion disposed partially within the top portion and a side portion of one of the front face and the rear face.

In a further non-limiting embodiment of any of the foregoing structural cooling assemblies, a conduit disposed within the washer fluid reservoir for placing a hot flow in thermal communication with fluid within the washer fluid reservoir.

In a further non-limiting embodiment of any of the foregoing structural cooling assemblies, the housing includes a second pocket defined below the first pocket between the front face and the back face and a secondary cooler is mounted within the second pocket.

In a further non-limiting embodiment of any of the foregoing structural cooling assemblies, the secondary cooler includes a bottom closure panel that attaches to a bottom portion of the housing to provide structural stiffness and close of a bottom opening of the second pocket.

In a further non-limiting embodiment of any of the foregoing structural cooling assemblies, the condenser includes a side closure panel that attaches to a side portion of the housing to provide structural stiffness and close off a side opening of the front pocket.

In a further non-limiting embodiment of any of the foregoing structural cooling assemblies, the vane portion comprises a first vane portion disposed on the front face for directing airflow into the first pocket and a second vane portion disposed on the front face for directing airflow into the second pocket.

In a further non-limiting embodiment of any of the foregoing structural cooling assemblies, at least one of the first vane portion and the second vane portion comprises an active grille shutter assembly In a further non-limiting embodiment of any of the foregoing structural cooling assemblies, the housing includes an integral horn trumpet portion within a side of one the front face and back face In a further non-limiting embodiment of any of the foregoing structural cooling assemblies, the fan shroud portion comprises a plurality of ribs extending radially outward from a fan mount portion.

In a further non-limiting embodiment of any of the foregoing structural cooling assemblies, the housing is formed as a single integral part from a plastic material containing fiber reinforcement material.

A method of assembling a structural cooling assembly according to another exemplary aspect of the present disclosure includes, among other things, forming a housing as single integral plastic reinforced part with an additive manufacturing process to include a first pocket between a front face and a back face, a degas chamber portion, a vane portion, a fan shroud portion, a bolster portion, a horn trumpet portion and at least one mounting portion mountable to a frame of a vehicle, mounting a condenser within the first pocket and attaching a side closure panel of the condenser to a side portion of the housing to provide structural stiffness and close a side opening of the first pocket, mounting a fan assembly within the fan shroud portion and mounting a radiator to the back face to the back face such that the fan assembly is disposed axially between the radiator and the condenser.

A further non-limiting embodiment of the foregoing method of assembling a structural cooling assembly including assembling a secondary cooler into a second pocket formed below the first pocket and attaching a bottom closure panel of the secondary cooler to the housing to provide structural stiffness and close a bottom opening of the second pocket.

A further non-limiting embodiment of any of the foregoing methods of assembling a structural cooling assembly including forming a washer fluid reservoir portion as an integral part of the housing separate from the fluid reservoir portion and assembling a conduit within the washer fluid reservoir portion for placing a hot flow in thermal communication with fluid within the fluid reservoir portion.

A further non-limiting embodiment of any of the foregoing methods of assembling a structural cooling assembly including forming the housing to include a top portion with a latch pocket and mounting a hatch latch assembly within the latch pocket of the housing such that the housing structure transfers latch loads to a frame of the vehicle.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 14 is a schematic view of an example assembly sequence of the structural cooling assembly.

DETAILED DESCRIPTION

Figure 1:
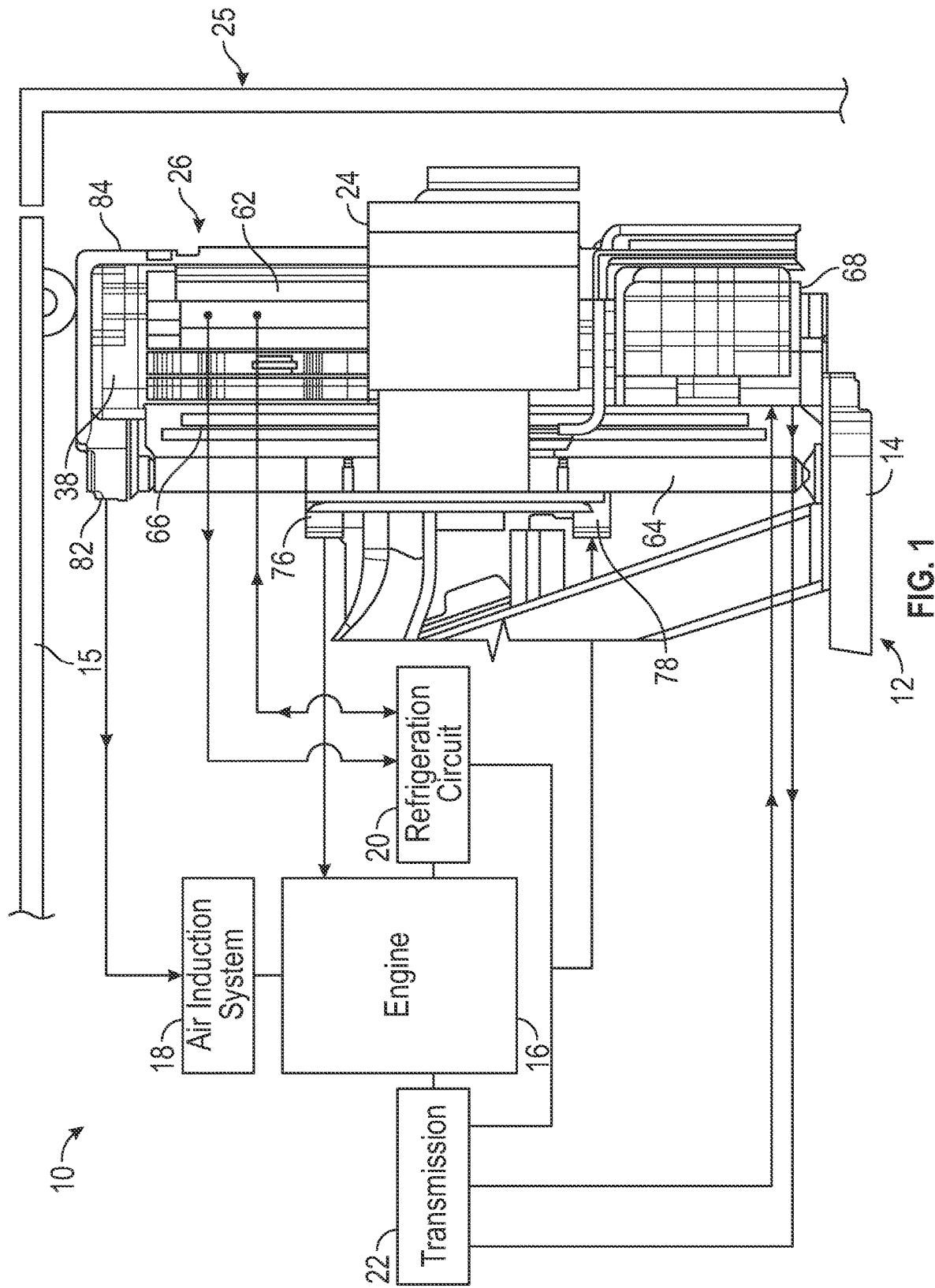
FIG. 1 is a schematic view of an example front end structure of a motor vehicle.
Figure 2:
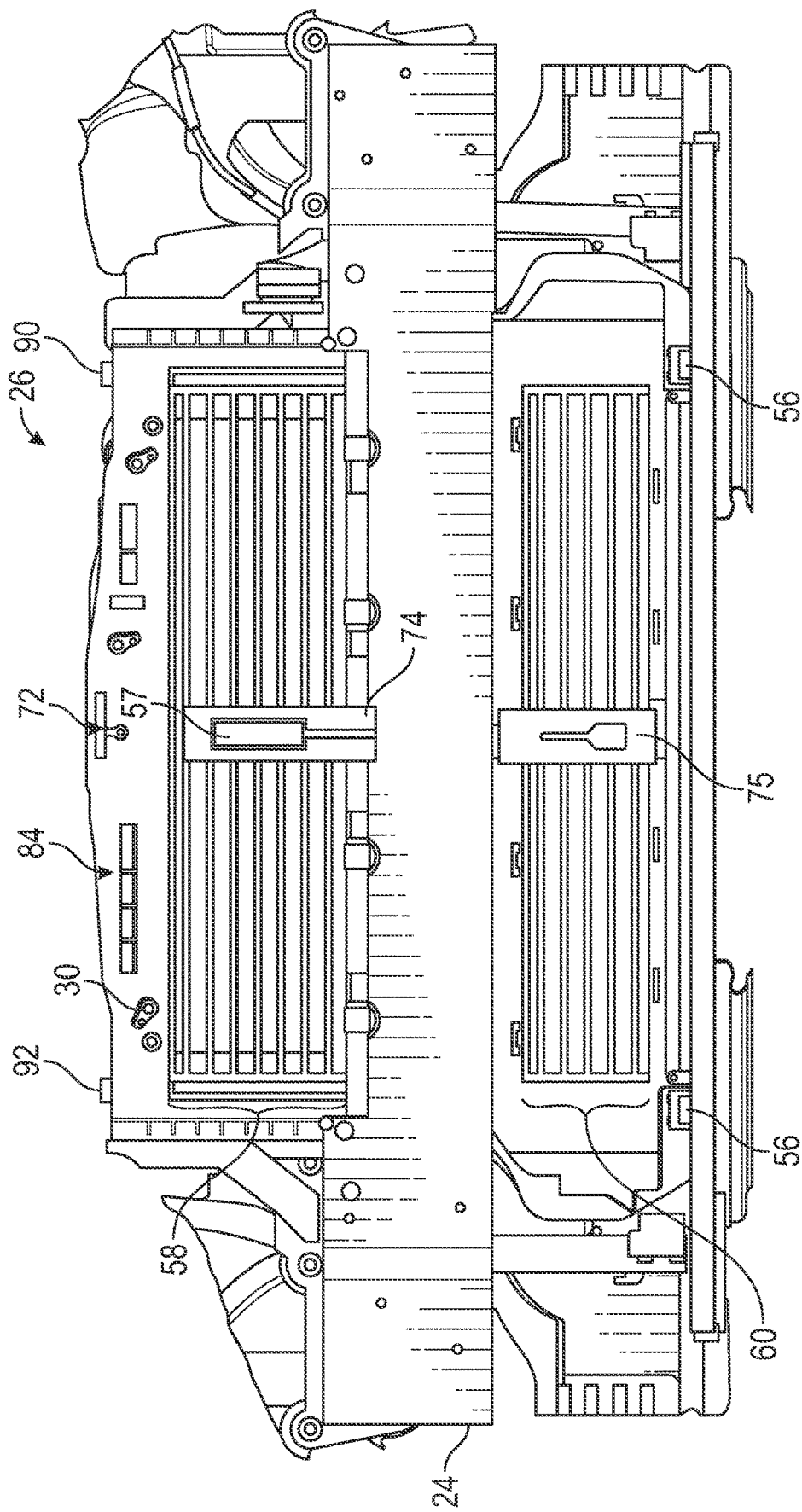
FIG. 2 is a front view of the example front end structure of a motor vehicle.

Referring to FIGS. 1 and 2, a front end structure 12 of a motor vehicle is shown with an example structural cooling assembly 26. An engine 16, transmission 22, air induction system 18 and compressor 20 are schematically shown proximate the front end structure 12, front vehicle facia 25 and the structural cooling assembly 26. The structural cooling assembly 26 includes components that support operation of vehicle systems as well as providing a structural part of the front end structure 12. The disclosed example structural cooling assembly 26 includes a one piece housing 28 to which are attached a radiator 64, a condenser 62, a charge air cooler 68 and a fan assembly 66. The structural cooling assembly 26 provides a single modular assembly that incorporates multiple components that support operation of different vehicle systems while also providing a structural part of the vehicle.

The radiator 64 includes an inlet 76 and outlet 78 to provide a coolant flow to the engine 16. The condenser 62 is coupled to a refrigerant circuit 20 for an environmental control system of the vehicle 10. The charge air cooler 68 cools air provided to the air induction system 18. It should be appreciated that although a charge air cooler 68 is disclosed by way of example, other secondary coolers such as an oil cooler, transmission cooler or any other cooler could also be utilized and are within the contemplation of this disclosure.

The housing 28 includes a first pocket 34 defined between a front face 30 and a back face 32. The first pocket 34 defines a space for the condenser 62. A second pocket 36 is provided below the first pocket 34 between the front face 30 and the back face 32. The charge air cooler 68 is supported within the second pocket 36. The second pocket 36 may be space open to the first pocket 34 or a separate space defined separate from the first pocket 34.

The housing 28 includes mounting portions that define attachment points to the vehicle frame 14 and bolster 24. The housing 28 further includes a location for a hood latch assembly 72 to secure a vehicle hood 15.

Figure 3:
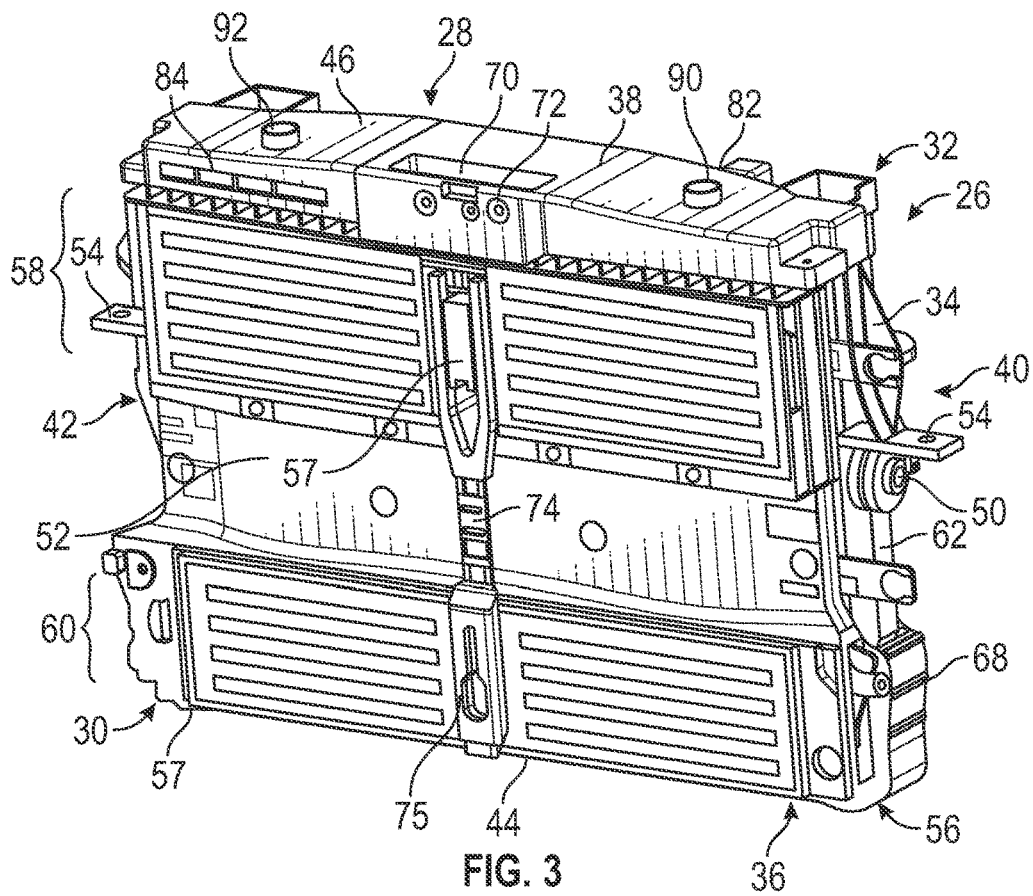
FIG. 3 is a front perspective view of an example structural cooling assembly.

Referring to FIG. 3 with continued reference to FIGS. 1 and 2, the housing 28 is a single unitary integral structure that provides features that are typically provided as separately mounted components. In this disclosed example, the housing 28 includes a top portion 38 with a latch pocket 70, degas reservoir 46 and an air passage 80. The housing 28 transfers latch loads through the structural cooling assembly 26 to the vehicle frame 14.

The front face 30 includes first and second vane assemblies 58, 60 disposed above and below a bolster portion 52. The vanes 58, 60 may be passive fixed vanes or part of an active grill shutter assembly that moves the vane assemblies 58, 60 to adjust airflow. In one disclosed embodiment, the active grill shutter assembly includes a drive link bar 74 that is coupled to an actuator 57 for moving the vanes 58, 60. The drive link bar 74 is coupled to a pivot housing 75 for moving the vanes 60. When opening the first vane assembly 58 with the actuator 57, the drive link bar 74 drives and opens the second lower vane section 60. The actuator 57 is controlled to adjust flow through the housing 28.

The bolster portion 52 corresponds with the bolster 24 of the vehicle 10 and may be oriented and shaped to accommodate different vehicle configurations.

The housing 28 further includes integral horn trumpets 50. The horn trumpets 50 are supported on each of the first side 40 and the second side 42. The horn trumpets 50 support sound producing devices that cooperate with the size and shape of the integrated horn trumpets 50 to provide a predefined tone. The sound producing device is not shown but may be any device that is actuatable to generate a sound and is mounted to the housing into and/or proximate the trumpets 50.

Figure 4:
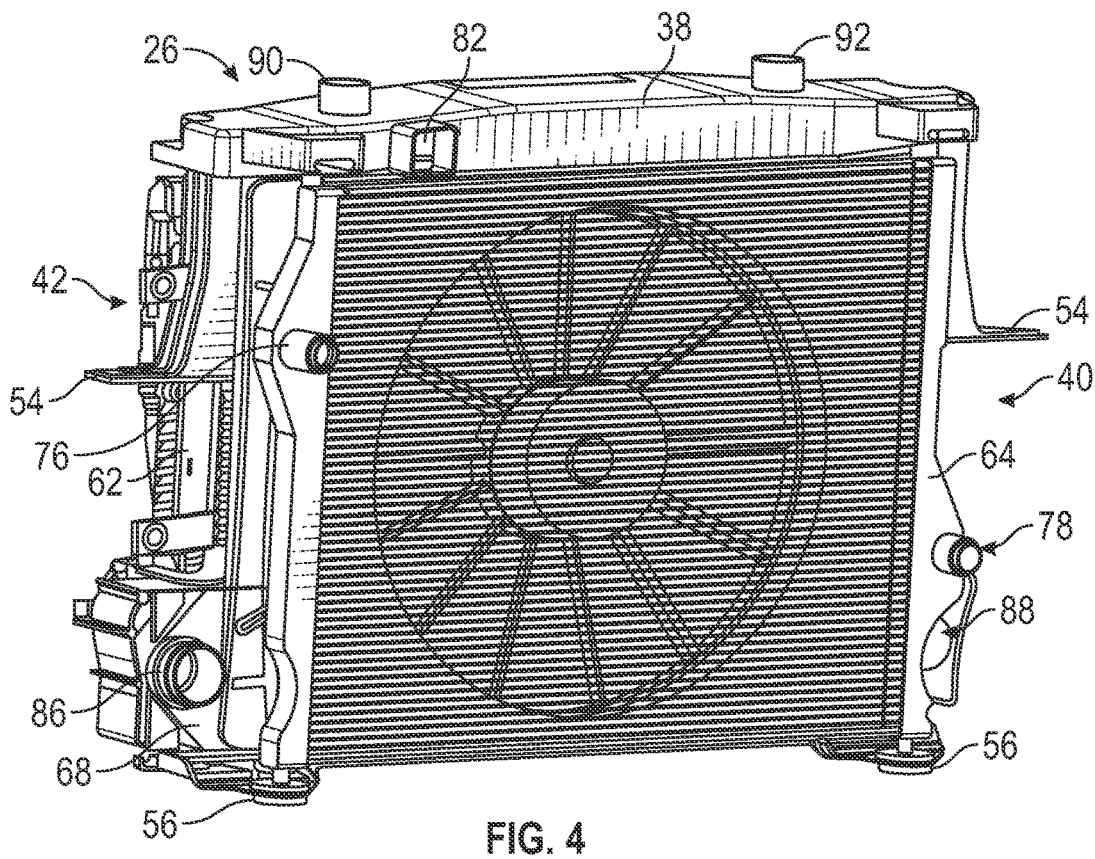
FIG. 4 is a rear perspective view of the example structural cooling assembly.

Referring to FIG. 4 with continued reference to FIG. 3, the back face 32 of the structural cooling assembly 26 is shown with the radiator 64 attached to the housing 28. An outlet 82 of the air passage 80 communicates airflow to the vehicle air induction system 18 (FIG. 1). Mounting feet 56 along with mounting flanges 54 are integral portions of the housing 28 and transfer weight of the structural cooling assembly 26 to the vehicle frame while also contributing to the structural stiffness of the front end structure 12.

An inlet 86 and an outlet 88 for the charge air cooler 68 face vehicle rearward and on either side of the radiator 64. The inlet 86 and outlet 88 accommodate attachment of ducts to communicate airflow required for operation of the charge air cooler.

Figure 5:
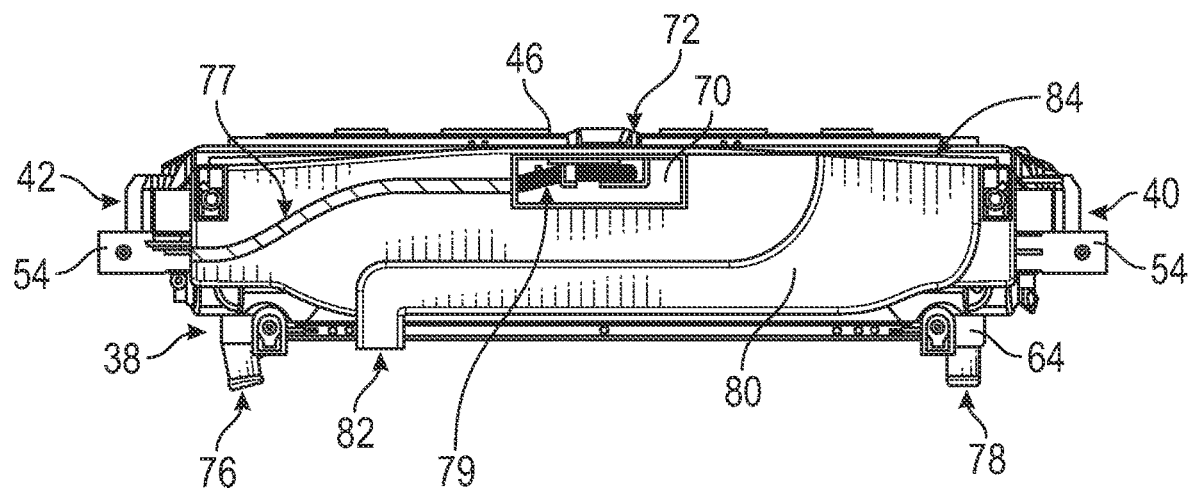
FIG. 5 is a top sectional view of the example structural cooling assembly.

Referring to FIG. 5 with continued reference to FIGS. 1 to 4, the top portion 38 is shown partially cut away to show the air passage 80 and the degas reservoir 46. The air passage 80 directs airflow from a forward inlet 84 to an aft outlet 82. The air passage 80 directs airflow through the housing 28 to the air induction system 18 (FIG. 1).

The degas reservoir 46 is formed within the top portion 38 and adjacent the air passage 80. The degas reservoir 46 is in fluid communication with the engine cooling system. It should be appreciated that the degas reservoir 46 may extend further within sides 40, 42 of the housing 28 to provide a predefined fluid capacity.

The latch pocket 70 provides a mounting location for the latch assembly 72. A tube 77 extends from latch pocket 70 through the degas reservoir 46 and out a side of the housing 28. The tube 77 is sealed off from the degas reservoir 46 to enable a latch cable 79 to be routed to the latch assembly 74. Incorporation of the tube 77 effectively hides the latch cable 79 to provide an enhanced aesthetic under hood appearance of the front end structure 12.

Figure 6:
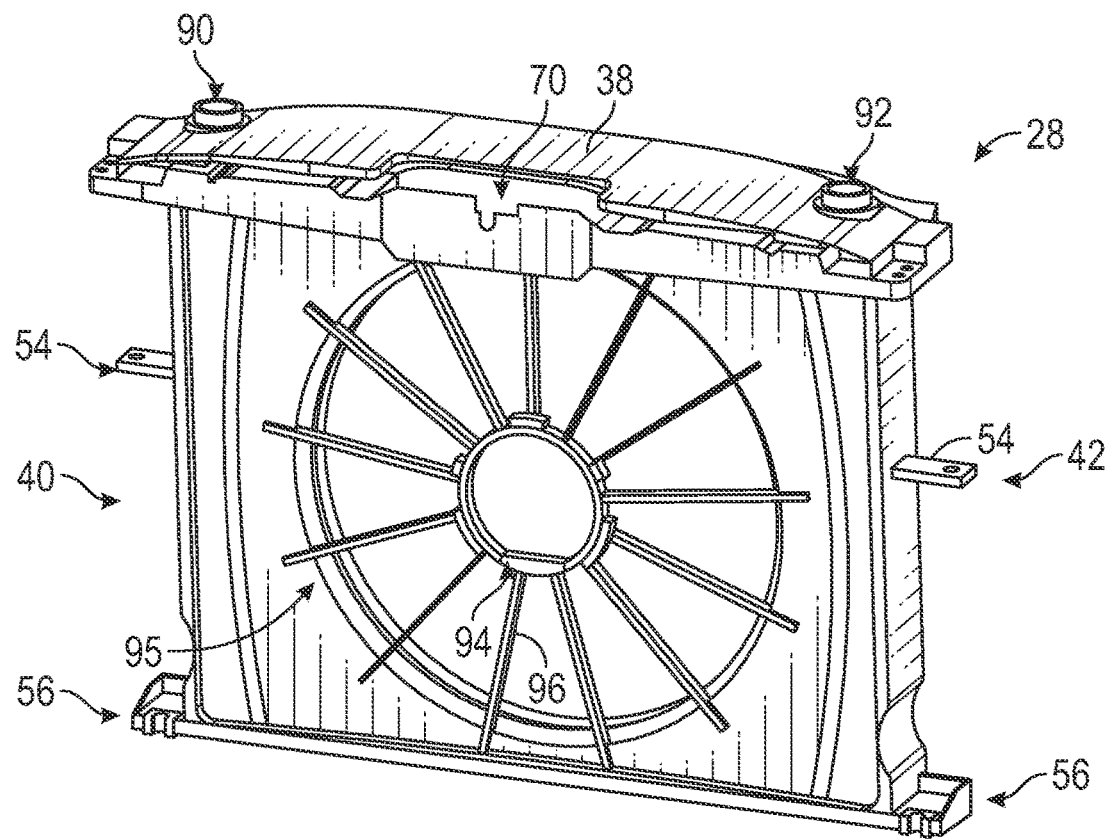
FIG. 6 is a perspective view of an example housing of the structural cooling assembly.
Figure 7:
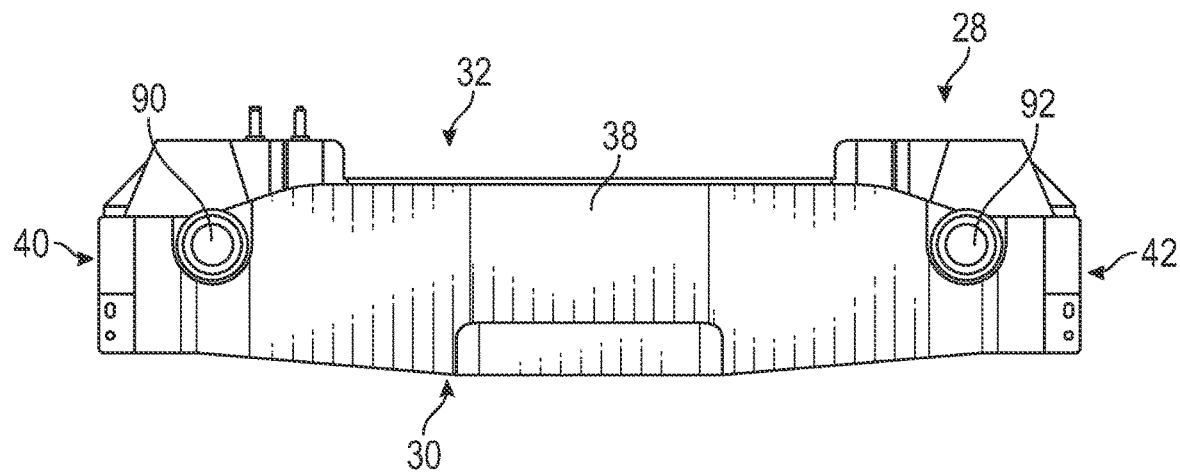
FIG. 7 is a top view of the example housing of the structural cooling assembly.

Referring to FIGS. 6 and 7, the example housing 28 includes a fan shroud portion 95 within which the fan 66 is mounted. The shroud portion 95 circumscribes an interior space for the fan 66. A fan mount ring 94 is supported by a plurality of radially extending support ribs 96. The mount ring 94 is within the housing 28 such that the fan can be mounted between the radiator 64 and the condenser 62. The front face 30 of the housing 28 is shown in FIG. 6. The fan 66 is mounted to the back face 32.

The top portion 38 includes the latch pocket 70 for the latch assembly and filler openings 90 and 92. The filler opening 90 is for the degas reservoir 46 and the filler opening 92 is for the washer fluid reservoir 48.

Figure 8:
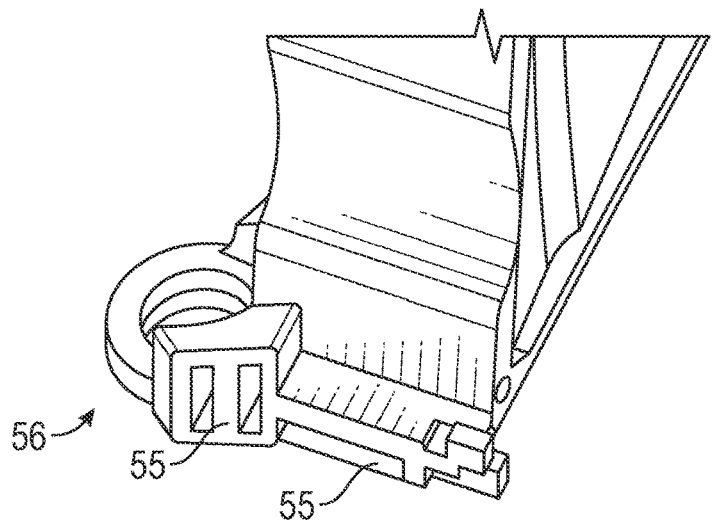
FIG. 8 is a perspective view of an example mounting foot of the example housing.
Figure 9:
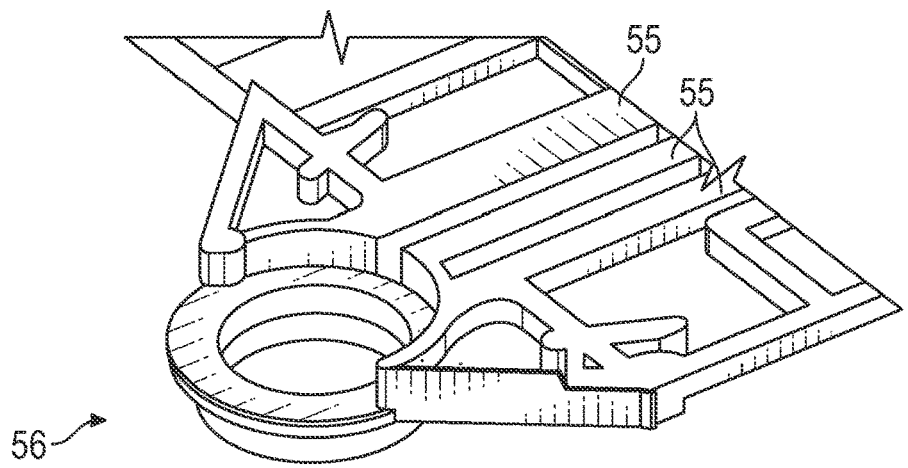
FIG. 9 is a partial sectional view of the example mounting foot of the example housing.

Referring to FIGS. 8 and 9, the mounting feet 56 are integral structures of the housing 28. The mounting feet 56 include internal stiffening ribs 55. The example housing 28 is formed utilizing an additive manufacturing process that enables formation of internal structures, such as the internal stiffening ribs 55, not practical with traditional injection molding processes. The stiffening ribs 55 are internal structures not visible in the completed housing 28 as shown in FIG. 6.

Figure 10:
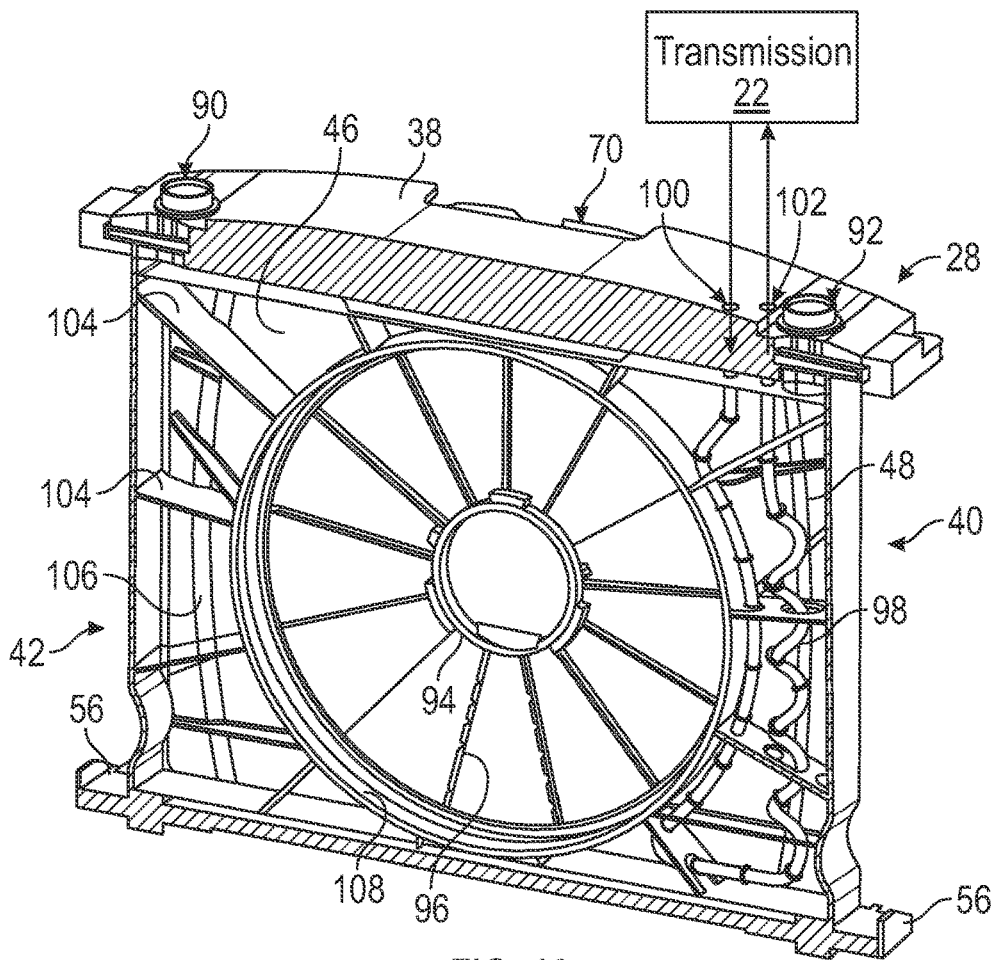
FIG. 10 is a partial sectional view of the example housing illustrating an integral washer reservoir portion.

Referring to FIG. 10, the housing 28 includes the interior open compartment that forms the washer fluid reservoir 48. The washer fluid reservoir 48 is disposed in one side 40 of the housing 28. The degas reservoir 46 is in the other side 42.

The hollowed sides 40, 42 include rib structures that provided a predefined rigidity to the housing 28. In this disclosed example, radially extending ribs 104 extend from a circumferential internal rib 108. The circumferential rib 108 corresponds with the fan shroud 95 that circumscribes the opening for the fan. A curved longitudinal rib 106 is provided on either side of the fan opening to provide additional rigidity. The rib structure is possible by the additive manufacturing process utilized for manufacture of the housing 28.

A conduit 98 is supported within the washer fluid reservoir 48. The conduit 98 is in communication through inlet 100 and outlet 102 with a source of hot fluid flow. In this example, the hot fluid flow is from a cooler for a transmission 22. However, other hot fluid flows, such as coolant from the radiator 64, may also be utilized. The conduit 98 places a hot fluid flow in communication with the washer fluid within the reservoir 48. The washer fluid is thereby heated to an elevated temperature.

Heated washer fluid is useful in colder climates to aid in the elimination of ice and snow build up on a windshield or rear window. A control system is utilized to govern hot fluid flow and thereby a temperature of the washer fluid. The inlet 100 and outlet 102 are integrally formed as part of the housing 28. Moreover, the conduit 98 may be formed as an integral part of the housing 28, or assembled as a separate part within the reservoir 48.

Figure 11:
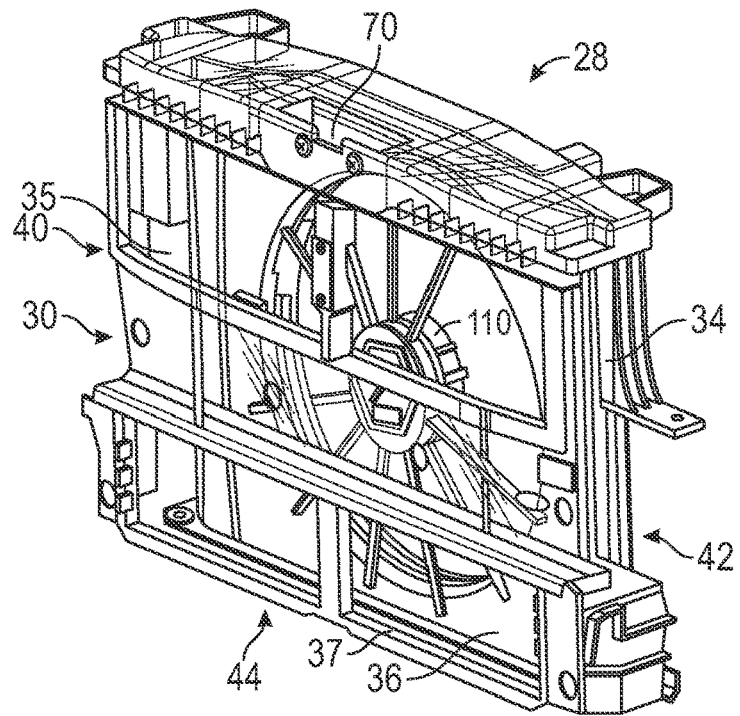
FIG. 11 is a front perspective view of the example housing.
Figure 12:
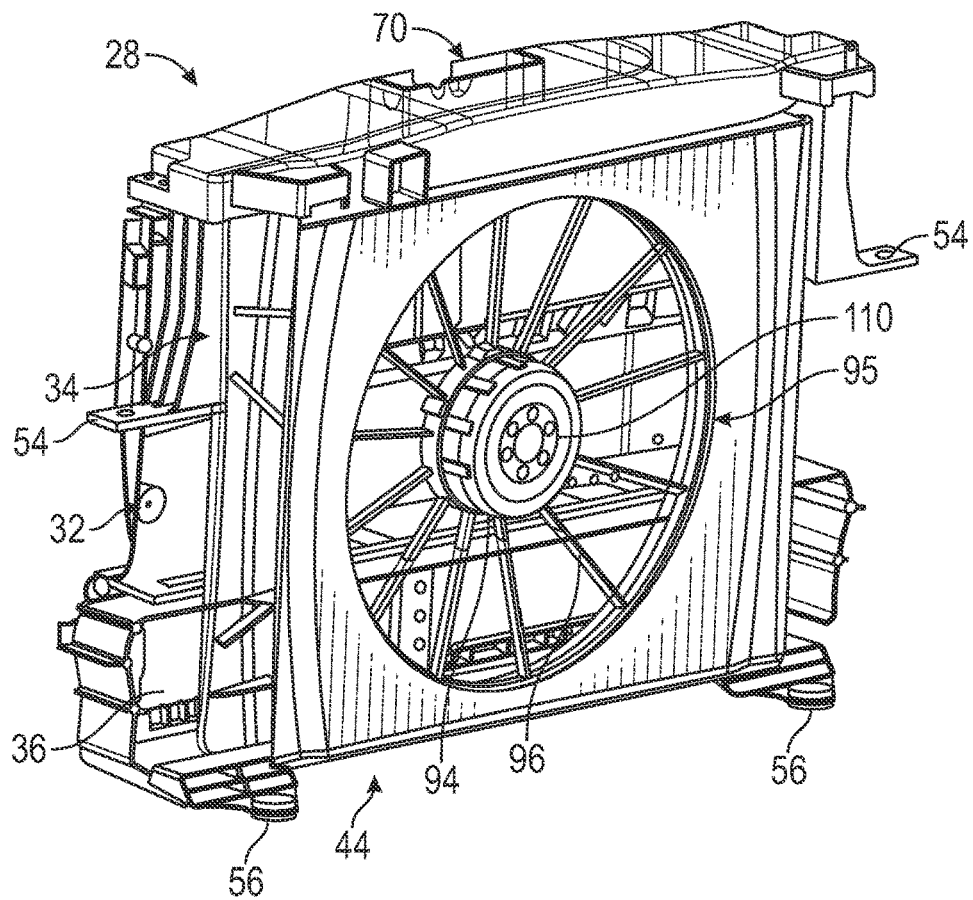
FIG. 12 is a rear perspective view of the example housing.
Figure 13:
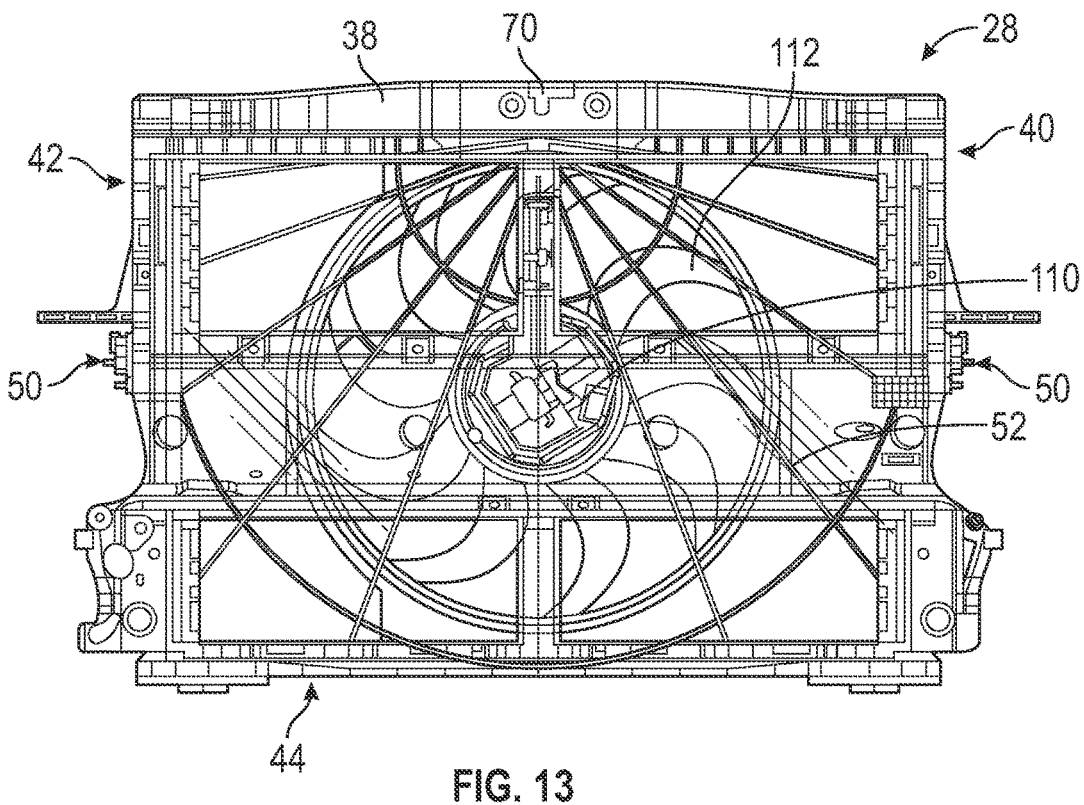
FIG. 13 is a rear view of the example housing with a fan assembly mounted within a shroud portion.

Referring to FIGS. 11, 12 and 13, the housing 28 is shown with the fan assembly 66 (FIG. 13) installed with a fan motor 110 supported within the fan mount 94. The housing 28 defines the first pocket 34 for the condenser 62 between the front face 30 and the back face 32. The second pocket 36 is defined below the first pocket 34 between the front face 30 and the back face 32. The first and second pockets 34, 36 include internal features and guides for supporting the condenser 62 and the charge air cooler 68. The pocket 34 is open to side opening 35 on the side 40. The first pocket 34 is closed on the side 42. The bottom portion 44 includes a bottom opening 37 that leads into the second pocket 36. Closure panels (FIG. 14) on each of the condenser 62 and the charge air cooler 68 attach to the housing 28 to secure each component and close off the corresponding one of the first and second pockets 34, 36.

Fan blades 112 rotate within the fan shroud 95 and pull air through the front face 30 and out the back face 32 and the radiator 64. The housing 28 defines the flow path for air through the fan blades 112 to create an efficient use of cooling air.

Referring to FIG. 14, a disclosed method of assembling a structural cooling assembly 26 is schematically shown. The method begins with formation of the housing 28 utilizing an additive manufacturing process schematically shown at 120. The example additive manufacturing process utilizes a reinforced plastic material 122. In this example, reinforced plastic material 122 is polyamide plastic material that is reinforced with 35% carbon fiber reinforcement. It should be appreciated that other plastic materials and combinations of reinforcement materials and quantities could be utilized and are within the contemplation and scope of this disclosure.

The additive manufacturing process 120 deposits layers of molten plastic material 122 that subsequently harden to form layers of the housing 28. Each layer is deposited in sequence on previous layers to form internal structures and features of the housing 28. The layer by layer build up enables formation of internal structures such as the ribs 104, 106 within the reservoirs 46, 48 (FIG. 10). Moreover, the additive manufacturing process enables formation of the internal support ribs provided within the mounting feet (FIGS. 8, 9).

Once the housing 28 if formed as the single integral part, components are assembled and attached to form the structural cooling assembly 26. In this example, a side closure panel 116 is attached to the condenser 62. The condenser 62 is then inserted into the first pocket 34 and the closure panel 116 secured to the side 40 of the housing 28 as is shown at 125. The side closure panel 116 secures the condenser 62 and seals the first pocket 34.

A bottom closure panel 114 is attached to the charge air cooler 68. The charge air cooler 68 is then inserted into the second pocket 36 through the bottom opening 37. The bottom closure panel 114 is then secured to the bottom portion 44 of the housing 28.

The fan assembly 66 is then mounted to the fan shroud portion 95 on the back face 32 as shown in FIG. 13. The radiator 64 is then assembled and secured to the back face 32. Accordingly, the fan assembly 66 is disposed within an axial space between the condenser 62 and the radiator 64. The latch assembly 72 is then assembled into the latch pocket 70.

The assembled structural cooling assembly 26 provides a single module with the proper spacing between the condenser 62, radiator 64 and the fan assembly 66. The assembled structural cooling assembly 26 further includes the integral features such as the degas reservoir 46, windshield washer fluid reservoir 46 and horn trumpets that are integrated as parts of the housing 28. The structural cooling assembly 26 may then be assembled as a single unit into a vehicle and secured in place to become a structural component of the vehicle front end structure 12.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A structural cooling assembly for a vehicle comprising:
   a housing including a front face, a back face and a top portion, the housing comprising a single integrated part including a fluid reservoir portion, a fan shroud portion, a bolster portion, an air intake passage defining a portion of an airflow path through the top portion of the housing to an air intake system of the vehicle and at least one mounting portion mountable to a frame of a vehicle; and
   a fan assembly mounted within the fan shroud portion.

2. The structural cooling assembly as recited in claim 1, wherein the housing includes the fluid reservoir is part of the top portion.

3. The structural cooling assembly as recited in claim 2, including a radiator mounted to the back face.

4. The structural cooling assembly as recited in claim 3, including a hatch latch assembly attached within a latch pocket formed as part of the top portion.

5. The structural cooling assembly as recited in claim 3, wherein the housing includes a washer fluid reservoir portion separate from the fluid reservoir portion, the washer fluid portion disposed partially within the top portion and a side portion of one of the front face and the rear face.

6. The structural cooling assembly as recited in claim 5, including a conduit disposed within the washer fluid reservoir for placing a hot flow in thermal communication with fluid within the washer fluid reservoir.

7. The structural cooling assembly as recited in claim 1, wherein the housing includes a first pocket and a second pocket, a condenser mounted within the first pocket and a secondary cooler is mounted within the second pocket.

8. The structural cooling assembly as recited in claim 7, wherein the secondary cooler includes a bottom closure panel that attaches to a bottom portion of the housing to provide structural stiffness and close of a bottom opening of the second pocket.

9. The structural cooling assembly as recited in claim 8, wherein the condenser includes a side closure panel that attaches to a side portion of the housing to provide structural stiffness and close off a side opening of the front pocket.

10. The structural cooling assembly as recited in claim 9, wherein the housing further includes a first vane portion disposed on the front face for directing airflow into the first pocket and a second vane portion disposed on the front face for directing airflow into the second pocket.

11. The structural cooling assembly as recited in claim 10, wherein at least one of the first vane portion and the second vane portion comprises an active grille shutter assembly.

12. The structural cooling assembly as recited in claim 1, wherein the housing includes an integral horn trumpet portion.

13. The structural cooling assembly as recited in claim 1, wherein the fan shroud portion comprises a plurality of ribs extending radially outward from a fan mount portion.

14. The structural cooling assembly as recited in claim 1, wherein the housing is formed as a single integral part from a plastic material containing fiber reinforcement material.

15. A method of assembling a structural cooling assembly comprising:
    forming a housing as single integral plastic reinforced part to include a front a back face, a fan shroud portion, a bolster portion, an air intake passage forming a portion of an air intake path through a top portion of the housing to an air intake system and at least one mounting portion mountable to a frame of a vehicle; and
    mounting a fan assembly within the fan shroud portion.

16. The method of assembling a structural cooling assembly as recited in claim 15, further comprising mounting a radiator to the back face and a fan assembly such that the radiator is disposed axially between the radiator and a condenser.

17. The method of assembling a structural cooling assembly as recited in claim 15, further comprising forming the housing to include a first pocket and mounting a condenser within the first pocket and attaching a side closure panel of the condenser to a side portion of the housing to provide structural stiffness and close a side opening of the first pocket.

18. The method of assembling a structural cooling assembly as recited in claim 17, including assembling a secondary cooler into a second pocket formed below the first pocket and attaching a bottom closure panel of the secondary cooler to the housing to provide structural stiffness and close a bottom opening of the second pocket.

19. The method of assembling a structural cooling assembly as recited in claim 18, including forming a washer fluid reservoir portion as an integral part of the housing separate from a degas chamber portion and assembling a conduit within the washer fluid reservoir portion for placing a hot flow in thermal communication with fluid within the washer fluid reservoir portion.

20. The method of assembling a structural cooling assembly as recited in claim 19, including forming the housing to include a top portion with a latch pocket and mounting a hatch latch assembly within the latch pocket of the housing such that the housing structure transfers latch loads to a frame of the vehicle.

* * * * *